United States Patent
Imamura

(10) Patent No.: US 11,603,016 B2
(45) Date of Patent: Mar. 14, 2023

(54) GEARBOX MECHANISM AND SEAT SLIDING DEVICE PROVIDED WITH THE GEARBOX MECHANISM

(71) Applicant: TF-METAL Co., Ltd., Shizuoka (JP)

(72) Inventor: Takashi Imamura, Shizuoka (JP)

(73) Assignee: TF-METAL CO., LTD., Shizuoka (JP)

(*) Notice: Subject to any disclaimer, the term of this patent is extended or adjusted under 35 U.S.C. 154(b) by 0 days.

(21) Appl. No.: 17/705,811

(22) Filed: Mar. 28, 2022

(65) Prior Publication Data
US 2022/0305962 A1   Sep. 29, 2022

(30) Foreign Application Priority Data
Mar. 29, 2021 (JP) .............................. JP2021-054850

(51) Int. Cl.
| | |
|---|---|
| B60N 2/06 | (2006.01) |
| B60N 2/02 | (2006.01) |
| B60N 2/07 | (2006.01) |
| F16H 25/20 | (2006.01) |
| F16H 57/00 | (2012.01) |

(52) U.S. Cl.
CPC .......... *B60N 2/067* (2013.01); *B60N 2/0232* (2013.01); *B60N 2/07* (2013.01); *F16H 25/20* (2013.01); *F16H 57/0025* (2013.01); *B60N 2002/0236* (2013.01); *B60Y 2410/124* (2013.01); *B60Y 2410/125* (2013.01); *F16H 2025/209* (2013.01)

(58) Field of Classification Search
CPC ....... F16H 57/0025; F16H 25/20; B60N 2/07; B60N 2/0232; B60N 2/067; B60Y 2410/124
See application file for complete search history.

(56) References Cited

U.S. PATENT DOCUMENTS

| | | | |
|---|---|---|---|
| 6,309,019 B1* | 10/2001 | Downey ............... | B60N 2/0224 297/344.13 |
| 8,453,529 B2 | 6/2013 | Birker et al. | |
| 9,973,056 B2* | 5/2018 | Copanas .................. | H02K 5/26 |
| 10,465,836 B2* | 11/2019 | Copanas .................. | F16M 7/00 |
| 10,814,753 B2* | 10/2020 | Eichhorn ................. | B60N 2/99 |
| 11,052,788 B2* | 7/2021 | Sprenger ................. | B60N 2/067 |
| 2005/0150317 A1* | 7/2005 | Desquesne ............. | B60N 2/067 74/89.36 |
| 2010/0044542 A1* | 2/2010 | Koga ................... | F16H 25/2003 74/89.23 |
| 2011/0079699 A1* | 4/2011 | Tarusawa ............... | B60N 2/067 248/429 |

(Continued)

*Primary Examiner* — David M Fenstermacher
(74) *Attorney, Agent, or Firm* — Nath, Goldberg & Meyer; Jerald L. Meyer

(57) ABSTRACT

A gearbox includes a first divided body and a second divided body, and a shaft projection is formed on and a through-hole is formed in divided surfaces of the first divided body and the second divided body. A second recess on the second divided body side includes a second arc portion formed concentrically with an axis center of a worm wheel, and an upper linear portion and a lower linear portion which extend linearly toward the first divided body side from both ends of the second arc portion. A first recess on the first divided body side includes a first linear portion which extends linearly in a direction orthogonal to an intersecting direction, and an upper arc portion and a lower arc portion which are formed continuous to both ends of the first linear portion.

5 Claims, 10 Drawing Sheets

(56) References Cited

U.S. PATENT DOCUMENTS

| | | | |
|---|---|---|---|
| 2011/0284718 A1* | 11/2011 | Kimura | B60N 2/0232 |
| | | | 248/560 |
| 2018/0066737 A1* | 3/2018 | Brickner | E05B 81/18 |
| 2019/0168638 A1 | 6/2019 | Geiges et al. | |
| 2020/0318717 A1* | 10/2020 | Song | B60N 2/853 |
| 2021/0339655 A1* | 11/2021 | Wang | B60N 2/067 |
| 2021/0394647 A1* | 12/2021 | Shim | B60N 2/0232 |
| 2022/0185150 A1* | 6/2022 | Flick | B60N 2/0715 |

* cited by examiner

GEARBOX MECHANISM AND SEAT SLIDING DEVICE PROVIDED WITH THE GEARBOX MECHANISM

CROSS REFERENCE TO RELATED APPLICATION

This application is based upon and claims the benefit of priority under 35U.S.C.§ 119 from Japanese Patent Application No. 2021-054850 filed on Mar. 29, 2021, the entire contents of which are incorporated herein by reference.

TECHNICAL FIELD

The present embodiment relates to a gearbox mechanism and a seat sliding device provided with the gearbox mechanism.

BACKGROUND

Conventionally, a gearbox mechanism has been known which includes a worm wheel disposed so as to rotate on an axis in one direction, a worm meshing with the worm wheel and disposed so as to rotate on an axis in a direction intersecting with the one direction, and a gearbox in which the worm wheel and the worm are rotatably housed.

Such a gearbox mechanism can be used as a part of a seat sliding device provided in a vehicle.

U.S. Pat. No. 8,453,529 and US Patent Application Publication No. 2019/0168638 disclose a gearbox mechanism to be used in a seat sliding device.

In U.S. Pat. No. 8,453,529 and US Patent Application Publication No. 2019/0168638, a gearbox is divided into right and left bodies, and a cylindrical shaft hole portion for rotatably supporting a cylindrical shaft portion of a worm wheel is formed, as a semicircular arc-shaped recess divided into right and left sides, in the front and the rear of a first housing section in which a gear portion of the worm wheel is housed. Further, a second housing section is formed in an upper portion of the first housing section of the gearbox. The second housing section is configured to rotatably house a worm meshing with the gear portion of the worm wheel in a state where the worm intersects with the gear portion of the worm wheel.

In order to connect the gearbox divided into the right and left bodies, in U.S. Pat. No. 8,453,529 and US Patent Application Publication No. 2019/0168638, a through-hole penetrating in a right-left direction is provided in a first divided body of the gearbox, and a shaft projection fitted into the through-hole of the first divided body is provided in the second divided body of the gearbox. After the two divided bodies are superposed on each other, a tip of the shaft projection is crushed by staking or the like, thereby connecting the right and left divided bodies.

SUMMARY

However, in the above-described conventional technique, when the tip of the shaft projection is staked, the divided surfaces (superposed surfaces of the divided bodies) of the gearbox may be fixed in a state where they have shifted in a vertical direction and a right-left direction. That is, since a predetermined clearance is provided between the shaft projection and the through-hole, the shaft projection may fall (inclination) when the tip of the shaft projection is staked. In addition, the entire shaft projection may expand in a radial direction, and thus the expanded shaft projection may lean (eccentricity). Due to these deformations of the shaft projection, when the tip end of the shaft projection is staked, a positional deviation in the vertical direction and the right-left direction may occur in the divided surfaces (superposed surfaces of the divided bodies) of the gearbox.

This positional deviation of the divided surfaces of the gearbox particularly affects the rotation of the worm wheel. That is, the shaft hole portion of the worm wheel is formed as a recess having a semicircular cross section in the respective divided bodies, and a positional deviation of the superposed surfaces of the divided bodies is one cause for an increase in vibration, abnormal noise, etc., when the worm wheel rotates.

Accordingly, an object of the present disclosure is to reduce the occurrence of vibration, abnormal noise, etc., when a worm wheel in a gearbox rotates, by devising the shape of shaft hole portions of the worm wheel such that a positional deviation of the divided surfaces of the gearbox is absorbed.

A gearbox mechanism according to the present disclosure is provided with a first gear; a second gear disposed to intersect with the first gear and meshing with the first gear; and a gearbox in which the first gear and the second gear are rotatably housed. The first gear includes a first gear portion disposed at a center portion of the first gear in an axial direction and meshing with the second gear, and a pair of first shaft portions smaller in outer diameter than the first gear portion and disposed on both sides of the first gear portion in an axial direction. The gearbox includes a first housing section in which the first gear portion is housed, a pair of shaft hole portions smaller in diameter than the first housing section and in which the first shaft portion is housed, and a second housing section configured to communicate with the first housing section on one side in an intersecting direction intersecting with the axial direction of the first gear and the axial direction of the second gear and in which the second gear is housed. A bearing bush is disposed between the first shaft portion and the shaft hole portion. The gearbox includes a first divided body and a second divided body which are divided in the axial direction of the second gear, and a shaft projection projecting toward an opposite divided body and a through-hole into which the shaft projection is inserted are formed in divided surfaces of the first divided body and the second divided body. The divided surfaces of the first divided body and the second divided body are formed at offset positions that are offset to the first divided body side in an intersecting direction with respect to an axis center of the first gear. A second recess on the second divided body side including the shaft hole portions includes a second semicircular arc portion formed concentrically with the axis center of the first gear, and a second linear portion which is formed continuous to both ends of the second arc portion and extends linearly toward the first divided body side in the intersecting direction. A first recess on the first divided body side including the shaft hole portions includes a first linear portion which is formed at a position superposed on the axis center of the first gear in the intersecting direction and extends linearly in a direction orthogonal to the intersecting direction, and a quarter-arc-shaped first portion which is formed continuous to both ends of the first linear portion and has the same radius of curvature as the second arc portion.

Further, a seat sliding device according to the present disclosure is provided with the gearbox mechanism, and a slide rail portion as a fixing side member to which the gearbox mechanism is fixed. The slide rail portion includes a lower rail fixed to a vehicle, an upper rail moving relative to the lower rail along a longitudinal direction of the lower rail, a screw shaft rotatably attached to one of the lower rail and the upper rail, extending along a direction of the relative movement, and integrally coupled to the first gear to rotate together with the first gear, and a nut member attached to the other of the lower rail and the upper rail and screwed onto the screw shaft.

The present embodiment makes it possible to reduce the occurrence of vibration, abnormal noise, etc., when a worm wheel in a gearbox rotates, by devising the shape of shaft hole portions of the worm wheel such that a positional deviation of the divided surfaces of the gearbox is absorbed.

DETAILED DESCRIPTION

Figure 1:
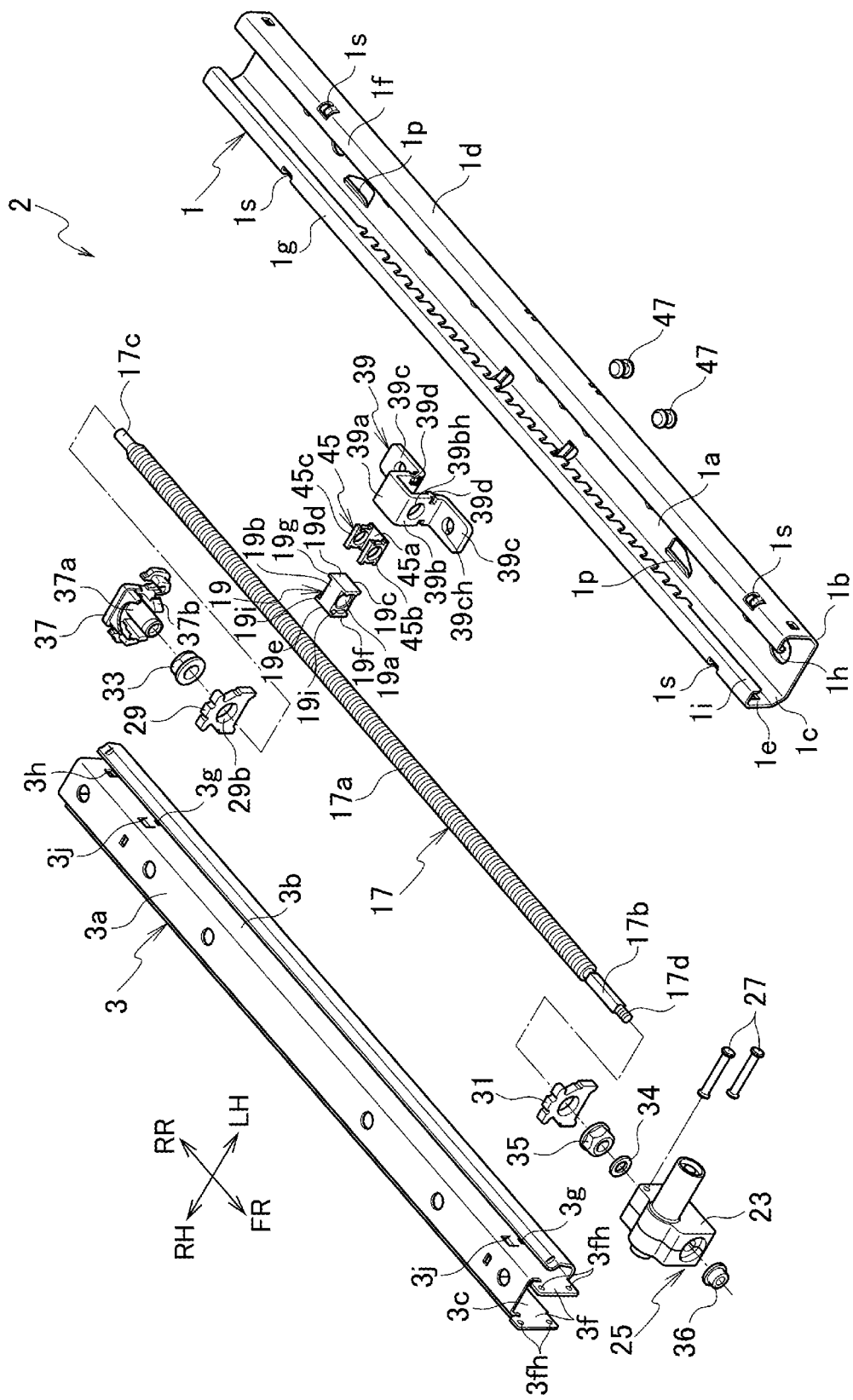
FIG. 1 is an exploded perspective view of a seat sliding device according to an embodiment of the present invention.

Embodiments of the present invention will be described below with reference to the drawings. In the drawings, a direction indicated by an arrow FR is the front of a vehicle body, a direction indicated by an arrow RR is the rear of a vehicle body, a direction indicated by an arrow LH is the left side of a vehicle body, and a direction indicated by an arrow RH is the right side of a vehicle body. In the following description, a "front-rear direction" and a "right-left direction" correspond to a "front-rear direction of a vehicle body" and a "right-left direction of a vehicle body" respectively, unless otherwise specified.

In the following description, an electric seat sliding device is exemplified as a seat sliding device provided with a gearbox mechanism.

[Example of Overall Structure of Seat Sliding Device]

First, an example of the overall structure of an electric seat sliding device (seat sliding device) 10 will be described with reference to FIGS. 1 to 7.

Figure 2:
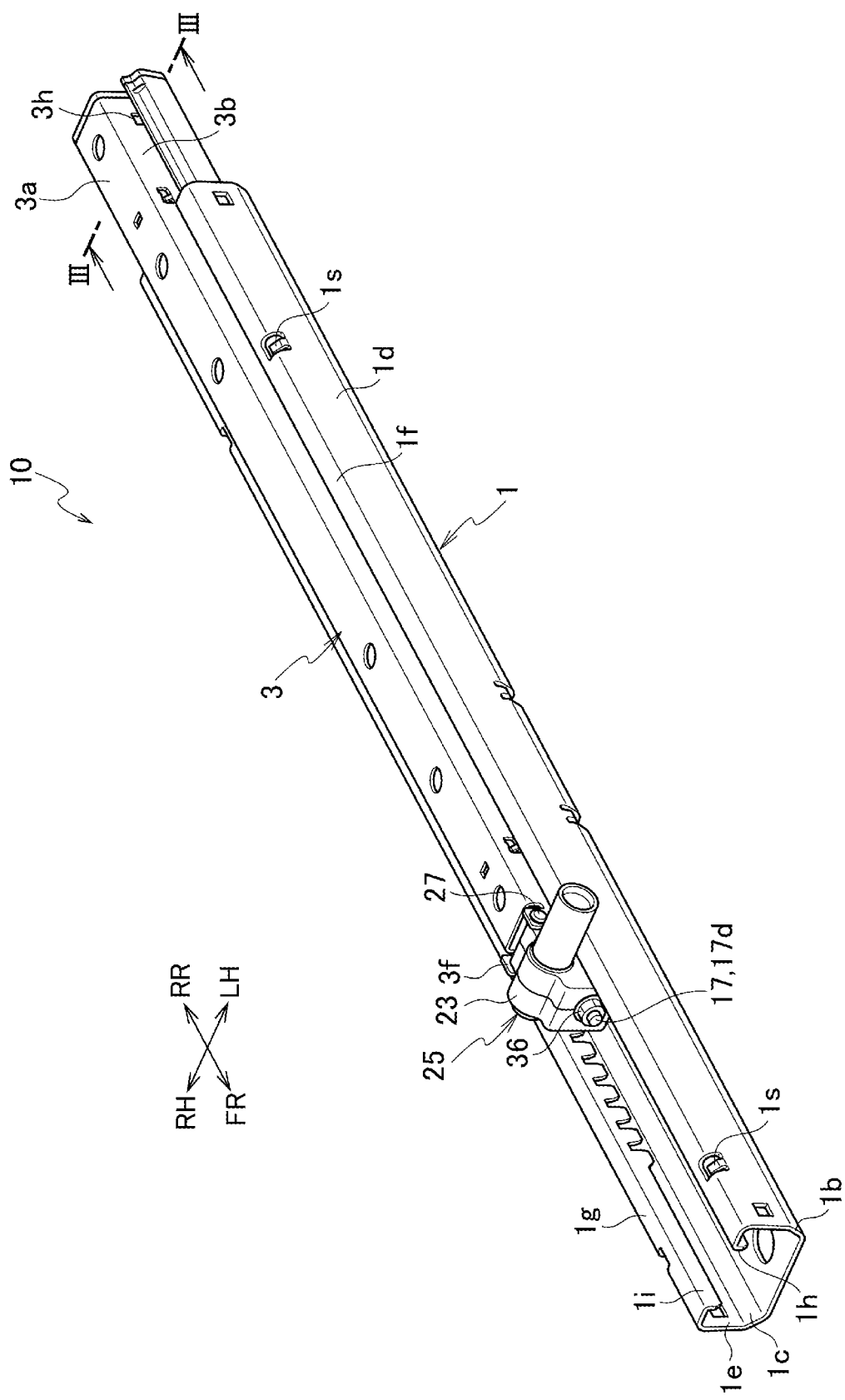
FIG. 2 is a perspective view of the seat sliding device according the embodiment.

As shown in FIGS. 1 and 2, an electric seat sliding device 10 mounted on a vehicle is provided with a lower rail 1 fixed to a floor surface of a vehicle body and extending along a front-rear direction of the vehicle, and an upper rail 3 moving relative to the lower rail 1 along a longitudinal direction inside the lower rail 1. The upper rail 3 is attached to a lower surface of a seat (not shown). Accordingly, the seat, together with the upper rail 3, moves in a front-rear direction with respect to the lower rail 1 attached to the floor surface of the vehicle body. The lower rail 1 and the upper rail 3 constitute a rail body.

The lower rail 1 includes inclined walls 1b and 1c extending outward obliquely upward from both right and left ends of a bottom wall 1a. The lower rail 1 also includes right and left side walls 1d and 1e extending upward from upper ends of the inclined walls 1b and 1c. The lower rail 1 also includes upper walls 1f and 1g extending inward from the upper ends of the right and left side walls 1d and 1e, and inner walls 1h and 1i extending downward from inner ends of the upper walls 1f and 1g substantially parallel to the side walls 1d and 1e. In the lower rail 1, the bottom wall 1a is fixed to the floor surface of the vehicle body via a plurality of fixtures (not shown).

Figure 3:
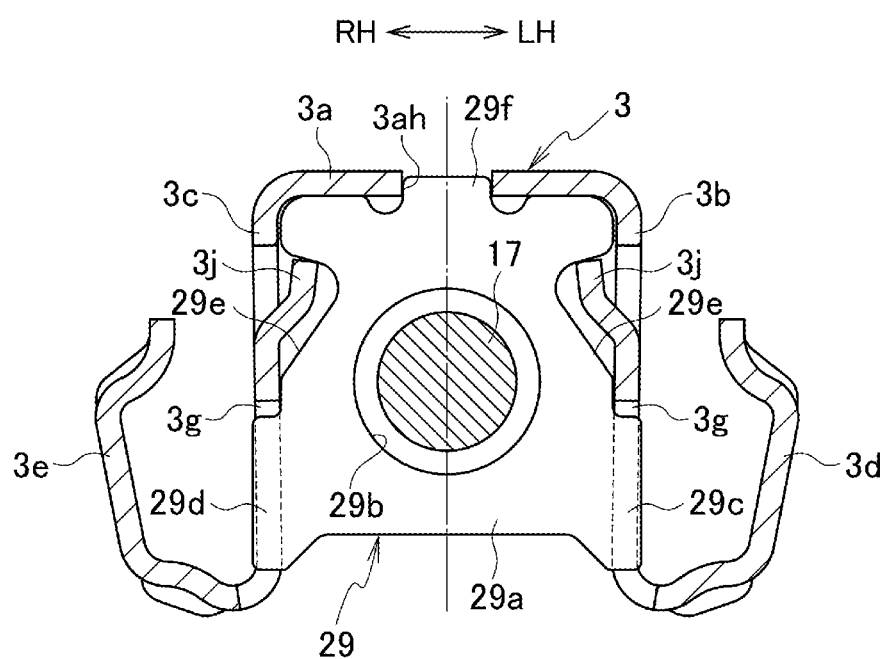
FIG. 3 is a cross-sectional view taken from line III-III of FIG. 2.

As shown in FIG. 3, the upper rail 3 includes right and left side walls 3b and 3c extending downward from both right and left sides of a top wall 3a, and folded portions 3d and 3e bent outward from lower ends of the right and left side walls 3b and 3c. In the upper rail 3, the top wall 3a is fixed to the lower surface of the seat via a plurality of fixtures (not shown) on the seat side.

A lower guide ball and an upper guide ball (not shown) are rotatably stored between: a lower ball holding portion and an upper ball holding portion formed in the folded portions 3d and 3e of the upper rail 3; and the lower rail 1. The lower guide ball and the upper guide ball are supported by a ball retainer (not shown). When the upper rail 3 moves in a front-rear direction with respect to the lower rail 1, the lower guide ball and the upper guide ball rotate to suppress friction between the rails and enable smooth movement.

As shown in FIGS. 1 and 2, respective fixed stoppers 1s are formed on the right and left sides near the front and rear ends of the lower rail 1. The fixed stoppers 1s are engaged with the ball retainer to prevent the plurality of lower guide balls and the upper guide balls from being disengaged from the lower ball holding portion and the upper ball holding portion as well as a positional deviation in the front-rear direction.

A screw shaft 17 extending along a movement direction of the upper rail 3 is disposed inside the upper rail 3. The screw shaft 17 has almost the same length as the upper rail 3 and is supported by the upper rail 3. Meanwhile, a nut member 19 is attached to the bottom wall 1a slightly to the rear side of the longitudinal center of the lower rail 1. The nut member 19 includes a female screw 19a into which a male screw 17a of the screw shaft 17 is screwed. That is, when the screw shaft 17 rotates, the screw shaft 17 (upper rail 3) moves in the front-rear direction with respect to the nut member 19 (lower rail 1).

The screw shaft 17 is rotationally driven by a drive unit 25 having a motor (not shown) and a gear box 23. The drive unit 25 is attached to a pair of right and left mounting plates 3f formed on the front side end of the upper rail 3 in the longitudinal direction. The drive unit 25 is attached to the mounting plates 3f by mounting holes 3fh formed in the mounting plates 3f and by fasteners 27 (rivets, bolt nuts, etc.).

As shown in FIG. 1, a serration 17b is formed at a front end of the screw shaft 17. The serration 17b is meshed with a worm wheel (not shown) rotatably supported in a gear box 23, so that the screw shaft 17 and the drive unit 25 are connected. Electric seat sliding devices except for a motor are provided at the right and left positions of the seat. An output shaft of a single motor provided in one of the electric seat sliding devices of the seat is connected to an input shaft (not shown) of the gear box 23 of the other electric seat sliding device by a connecting member (not shown). Thus, the screw shafts 17 of the right and left electric seat sliding devices are driven synchronously.

Reinforcing plates 29 and 31 as reinforcing members are attached to the front and rear sides of the upper rail 3. The reinforcing plates 29 and 31 are formed substantially in a plate shape orthogonal to the screw shaft 17, and attached inside the upper rail 3 so as to straddle between the right and left side walls 3b and 3c of the upper rail 3.

Figure 4:
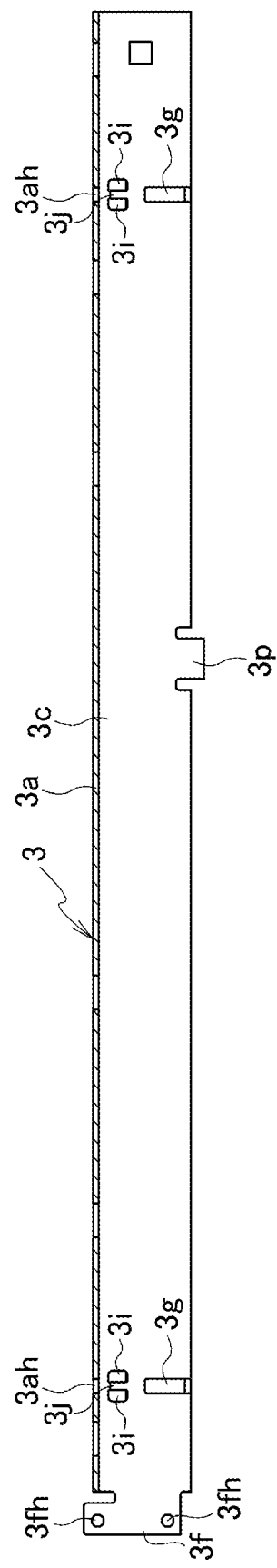
FIG. 4 is a side sectional view of an upper rail shown in FIG. 1.
Figure 5:
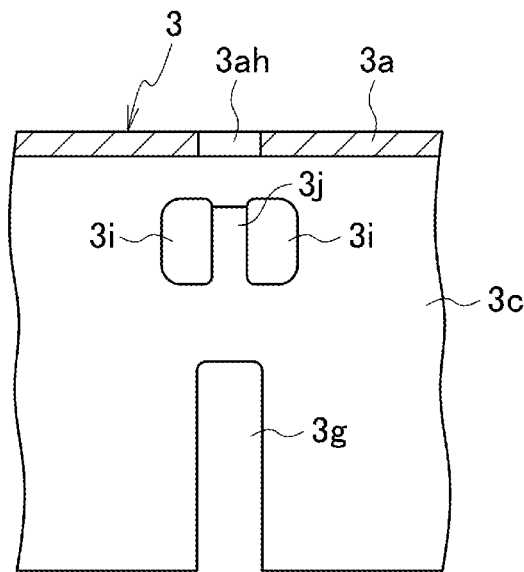
FIG. 5 is an enlarged view showing the periphery of a tongue-piece of the upper rail of FIG. 4.

A slit 3g is formed long in a vertical direction as shown in FIGS. 4 and 5. The slit 3g extends from the lower ends of the side walls 3b and 3c to a vertically intermediate position of the side walls 3b and 3c along a direction orthogonal to the longitudinal axis of the upper rail 3 (vertical direction).

As shown in FIGS. 4 and 5, a pair of holes 3i and 3i are formed in the right and left side walls 3b and 3c of the upper rail 3 so as to be positioned higher than the slits 3g. The pair of holes 3i and 3i are formed in the side walls 3b and 3c with an interval therebetween in the front-rear direction, and a bridging portion is formed between the pair of holes 3i and 3i. A tongue-piece 3j serving as a locking-piece is formed by separating an upper end of the bridging portion from the side walls 3b and 3c by shearing.

Figure 6:
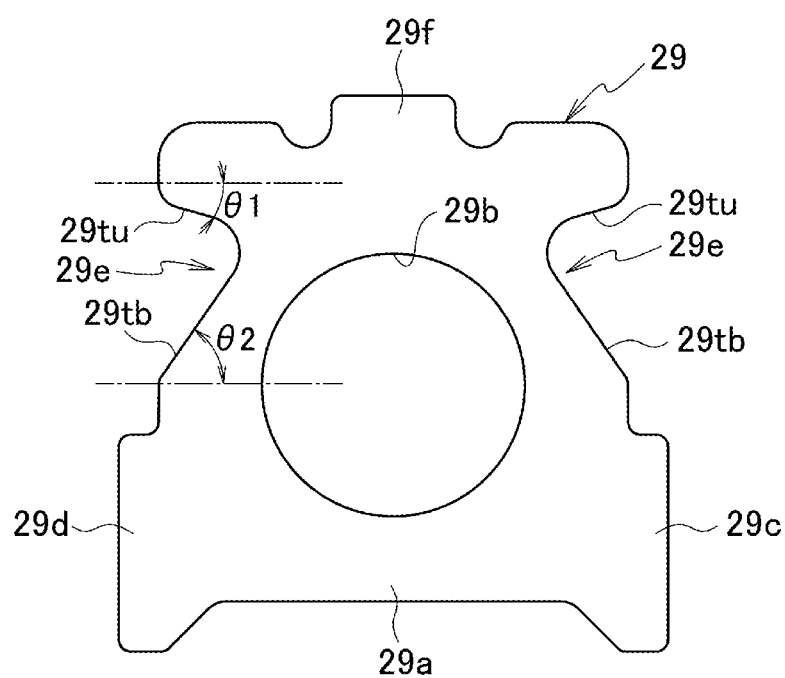
FIG. 6 is a front view of a reinforcing plate used in the seat sliding device of FIG. 1.

FIG. 6 shows a rear reinforcing plate 29 of the two front and rear reinforcing plates 29 and 31 attached in the slits 3g. Since the two reinforcing plates 29 and 31 have the same shape, only the rear reinforcing plate 29 will be described hereinafter.

In the reinforcing plate 29, a through-hole 29b is formed in the center of a plate portion 29a and the screw shaft 17 is inserted into the through-hole 29b. An inner diameter of the through-hole 29b is larger than an outer diameter of the screw shaft 17. Accordingly, the screw shaft 17 is rotatable with respect to the reinforcing plate 29 in a state where the screw shaft 17 is inserted into the through-hole 29b. When the screw shaft 17 moves in the front-rear direction together with the upper rail 3 with respect to the nut member 19 (lower rail 1) by rotation, an upper rail projection 3p shown in FIG. 4 abuts a pair of front and rear lower rail projections 1p shown in FIG. 1. This restricts the upper rail 3 from moving in the front-rear direction.

As shown in FIG. 4, the upper rail projection 3p projects downward at a position slightly rearward of the center of the upper rail 3 in the front-rear direction. Upper rail projections 3p project downward continuing from the right and left side walls 3b and 3c by leaving portions between the right and left side walls 3b and 3c and the folded portions 3d and 3e unbent, and are formed on both the right and left sides. As shown in FIG. 1, the lower rail projections 1p provided in the front and the rear are formed by cutting and raising the bottom wall 1a of the lower rail 1 upward, and are formed on both the right and left sides corresponding to the right and left upper rail projections 3p.

A bearing nut 33 is disposed on the rear side of the rear reinforcing plate 29, and a bearing nut 35 is disposed on the front side of the front reinforcing plate 31. The bearing nuts 33 and 35 are lock nuts with some of the threads crushed in advance. The bearing nuts 33 and 35 are screwed into a predetermined position of the male screw 17a of the screw shaft 17 and fixed thereto. With a state where a conventional nut is screwed into a predetermined position of the male screw 17a of the screw shaft 17, the nut may be fixed to the screw shaft 17 by means of staking by pushing a plurality of portions of the nut from the outer periphery of the nut toward the axial center.

When an impact load directed to the front of a vehicle body acts on the upper rail 3 due to a vehicle collision or the like, the reinforcing plate 31 at the front of the vehicle body moves to the front of the vehicle body, so that the reinforcing plate 31 collides with the bearing nut 35 at the front of the vehicle body. Accordingly, it is possible to prevent an impact load from being directly transmitted from the upper rail 3 to the gear box 23 connected to the upper rail 3. For this reason, this prevents an impact load which would separate the gearbox 23 from the screw shaft 17, caused by the transmission of the impact load to the gear box 23, from acting. At this time, a tensile force acts on the screw shaft 17.

When an impact load directed to the rear of the vehicle body acts on the upper rail 3, the reinforcing plate 29 at the rear of the vehicle body collides with the bearing nut 33 at the rear of the vehicle body. Accordingly, it is possible to prevent an impact load from being directly transmitted from the upper rail 3 to the gear box 23 connected to the upper rail 3. Thus, this prevents the gear box 23 from pushing the screw shaft 17, caused by the transmission of the impact load to the gear box 23. A tensile force also acts on the screw shaft 17.

With the screw shaft 17 disposed in the upper rail 3, a rear end 17c on the rear side is rotatably supported by a bearing portion 37a of an end cap 37. The end cap 37 is attached by engaging with engagement holes 3h formed in the side walls 3b and 3c of the upper rail 3. This attachment is performed by means of a pair of right and left engagement claws 37b provided so as to sandwich the bearing portion 37a. A male screw is formed at a front end 17d formed further forward than the serration 17b of the screw shaft 17. A washer 34 is inserted in contact with an end face of the male screw 17a of the screw shaft 17. As shown in FIG. 2, when the nut 36 is screwed onto the male screw, a worm wheel (not shown) in the gear box 23 is fixed so as to be sandwiched between the washer 34 (end surface of the male screw 17a) and the nut 36, and the screw shaft 17 is fixed in the axial direction to the worm wheel (not shown) in the gear box 23.

As shown in FIG. 6, in the reinforcing plate 29, lower locking portions (locking portions) 29c and 29d projecting outward in the right-left direction are formed at lower portions on both sides of the plate portion 29a in the right-left direction. The lower locking portions 29c and 29d are engaged with the slits 3g at the lower portions of the side walls 3b and 3c of the upper rail 3.

The reinforcing plate 29 has a recess 29e formed in upper portions of both sides of the plate portion 29a in the right-left direction, in such a way as to be recessed toward the inner side in the right-left direction. The recess 29e is engaged with the tongue-piece 3j formed in upper portions of the side walls 3b and 3c of the upper rail 3. An upper tapered surface 29tu inclining downward as moving inward in the right-left direction is formed on an upper side surface (upper inner surface) of the recess 29e, and a lower tapered surface 29tb inclining upward as moving inward in the right-left direction is formed on a lower side surface (lower inner surface) of the recess 29e. An inclination angle θ1 of the upper tapered surface 29tu with respect to a horizontal plane is set smaller than an inclination angle θ2 of the lower tapered surface 29tb with respect to the horizontal plane.

Further, the reinforcing plate 29 includes an upper locking portion 29f projecting upward from an upper end of the plate portion 29a. The reinforcing plates 29 and 31 are attached to an upper engagement hole 3ah formed in the top wall 3a of the upper rail 3 by fitting the upper locking portion 29f formed in an upper end into the upper engagement hole 3ah formed in the top wall 3a of the upper rail 3. The height of the upper locking portion 29f is set so as not to project upward from the top wall 3a of the upper rail 3.

Next, the attachment structure of the nut member 19 to the lower rail 1 will be described.

Figure 7:
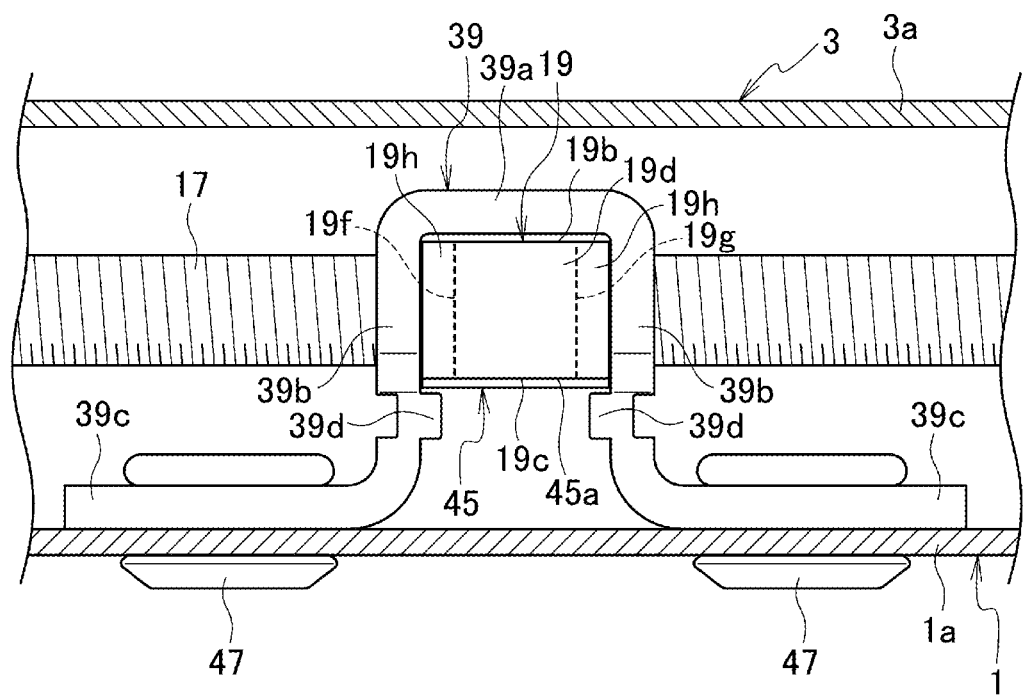
FIG. 7 is a sectional view showing an attachment state of a nut member used for the seat sliding device of FIG. 1.

As shown in FIG. 7, the nut member 19 is attached to the lower rail 1 by a bracket 39. The bracket 39 is fixed to the lower rail 1 so as to cover the upper side of the nut member 19. An elastic member 45 is interposed between the bracket 39 and the nut member 19. The elastic member 45 is made of an elastically deformable material such as rubber and is formed into a U-shape in a side view.

The nut member 19 includes an upper surface 19b, a lower surface 19c, a left side surface 19d, a right side surface 19e, a front surface 19f and a rear surface 19g, and is formed into a substantially rectangular parallelepiped shape as a whole. The female screw 19a is formed passing through between the front surface 19f and the rear surface 19g in the front-rear direction.

The respective restriction projections 19h projecting forward and backward are formed on the front surface 19f side and the rear surface 19g side of the left side surface 19d. The respective restriction projections 19i projecting forward and backward are formed on the front surface 19f side and the rear surface 19g side of the right side surface 19e. Each of the restriction projections 19h and 19i is formed over the entire length of the nut member 19 in the vertical direction. The restriction projections 19h and 19i are disposed so as to sandwich the elastic member 45 from both the right and left sides in a state where the elastic member 45 is mounted on the nut member 19.

The bracket 39 includes a flat portion 39a facing the upper surface 19b of the nut member 19, and a pair of wall surface portions 39b extending downward from both ends, in the front-rear direction, of the flat portion 39a and facing the front and rear surfaces of the nut member 19. The bracket 39 is provided with a pair of attachment surface portions 39c extending in directions mutually separating from the lower ends of the pair of wall surface portions 39b (front-rear direction).

An insertion hole 39bh into which the screw shaft 17 is inserted is formed in the wall surface portion 39b. An inner diameter of the insertion hole 39bh is larger than an outer diameter of the screw shaft 17. An anti-rotation projection 39d is formed on a portion lower than the insertion hole 39bh of the wall surface portion 39b. An attachment hole 39ch for attaching the bracket 39 to the bottom wall 1a of the lower rail 1 is formed in the attachment surface portion 39c.

The bracket 39 is formed of a metal plate, and as shown in FIG. 7, with the attachment surface portions 39c of the bracket 39 overlaid on the bottom wall 1a of the lower rail 1, rivets are inserted as fixtures 47 into the insertion holes 39ch from the lower sides, thereby fixing the bracket 39 by staking from the attachment surface portion 39c sides.

As shown in FIG. 7, the elastic member 45 includes a damper lower surface 45a in contact with the lower surface 19c of the nut member 19. A damper front surface 45b and a damper rear surface 45c are formed extending upward from a front end edge and a rear end edge of the damper lower surface 45a, respectively. Damper through-holes penetrating in the front-rear direction are formed in the damper front surface 45b and the damper rear surface 45c. The screw shaft 17 is inserted into the damper through-holes. An inner diameter of the damper through-hole is larger than an outer diameter of the screw shaft 17 and is almost equal to that of the insertion hole 39bh of the bracket 39.

End edges of the damper front surface 45b and the damper rear surface 45c in the right-left direction are positioned further on the inner side in the right-left direction than the end edges of the damper lower surface 45a in the right-left direction. In other words, the respective end edges of the damper lower surface 45a on both the right and left sides project more outwardly in the right-left direction than the respective end edges of the damper front surface 45b and the damper rear surface 45c on both the right and left sides.

[Example of Overall Configuration of Gearbox Mechanism]

Next, an example of the overall configuration of a gearbox mechanism 23 will be described in detail with reference to FIGS. 8 to 14.

Figure 8:
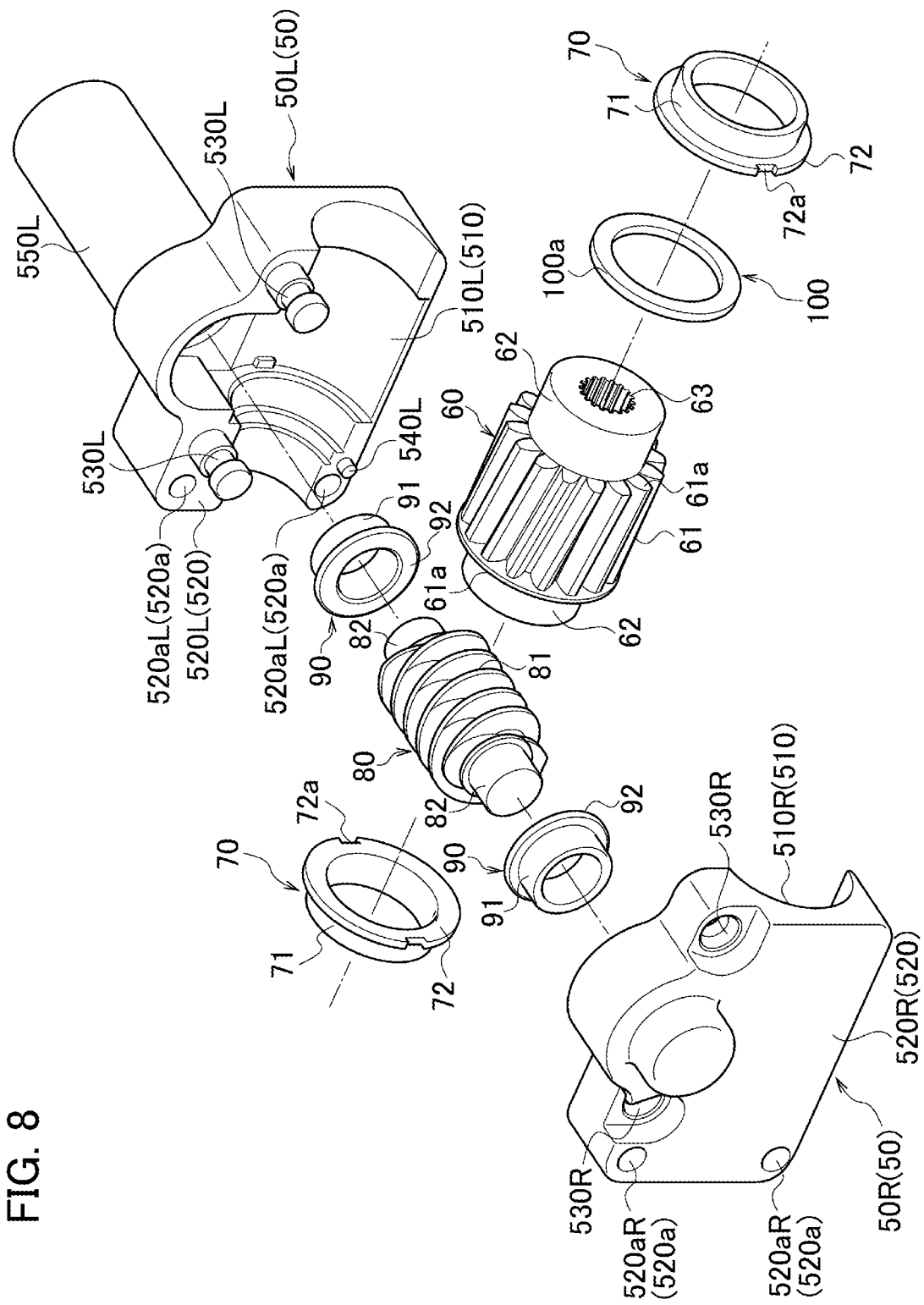
FIG. 8 is an exploded perspective view showing a gearbox mechanism provided in the seat sliding device according to the embodiment.

As shown in FIG. 8, the gearbox mechanism 23 includes a worm wheel (first gear) 60 rotatably disposed on an axis in one direction (front-rear direction), a worm (second gear) 80 intersecting and meshing with the worm wheel 60, and a gearbox 50 in which the worm wheel 60 and the worm 80 are rotatably housed.

In the present embodiment, the worm wheel 60 includes a first gear portion 61 disposed at a center portion in a front-rear direction (axial direction of the worm wheel 60) and meshing with the worm 80, and a pair of first shaft portions 62 smaller in outer diameter than the first gear portion 61 and disposed on both sides of the first gear portion 61 in a front-rear direction (axial direction of the worm wheel 60) (see FIG. 8).

Further, a serration hole 63 is provided in an axial center (center portion) of the worm wheel 60 so as to penetrate in the front-rear direction (axial direction of the worm wheel 60). The serration 17b of the screw shaft 17 is inserted into the serration hole 63 to mesh therewith, whereby the screw shaft 17 is integrally connected to the worm wheel (first gear) 60 to rotate together with the worm wheel (first gear) 60.

Meanwhile, the worm 80 includes a second gear portion 81 disposed at a center portion in a right-left direction (axial direction of the worm 80) and meshing with the first gear portion 61, and a pair of second shaft portions 82 smaller in outer diameter than the second gear portion 81 and disposed on both sides of the second gear portion 81 in the right-left direction (axial direction of the worm 80) (see FIG. 8). An output shaft of a motor (not shown) is directly or indirectly connected to the worm 80, and when the motor is driven, the worm 80 rotates in the right-left direction. The rotation of the worm 80 is transmitted from the second gear portion 81 to the first gear portion 61, and the worm wheel 60 rotates on an axis in the front-rear direction.

As shown in FIGS. 8 to 12, the gearbox 50 includes a worm wheel housing section 510 in which the worm wheel (first gear) 60 is housed. In the present embodiment, the worm wheel housing section 510 includes a cylindrical first gear housing section (first housing section) 511 in which the first gear portion 61 is housed, and a cylindrical front side shaft hole portion 512 and a cylindrical rear side shaft hole portion 513 (a pair of shaft hole portions) in which the first shaft portion 62 is housed.

Here, the pair of shaft hole portions are smaller in diameter than the first gear housing section 511. Accordingly, an annular side surface 511b defining the front-rear direction (axial direction of the first gear) is formed at a boundary portion with the shaft hole portion in the first gear housing section 511. Thus, in the present embodiment, the first gear housing section 511 is equal to a substantially cylindrical space defined by an inner peripheral surface 511a having a cylindrical side surface and annular side surfaces 511b formed at both ends of the inner peripheral surface 511a in the front-rear direction.

Meanwhile, the front side shaft hole portion 512 is equal to a substantially cylindrical space defined by an inner peripheral surface 512a having a cylindrical side surface, and the rear side shaft hole portion 513 is equal to a substantially cylindrical space defined by an inner peripheral surface 513a having a cylindrical side surface.

Further, in the present embodiment, the worm wheel housing section 510 includes a screw shaft insertion hole (introduction hole) 514 which communicates with the rear side shaft hole portion 513, which is formed on the rear side (one side) in the front-rear direction (axial direction of the first gear), from the rear. The screw shaft insertion hole 514 is smaller in diameter than the rear side shaft hole portion 513 and opens to the rear (outside) of the gearbox 50. The front side shaft hole portion 512 is formed to open to the front (outside) of the gearbox 50. Thus, in the present embodiment, the worm wheel housing section 510 is formed in the gearbox 50 as a through-hole penetrating in the front-rear direction. It is preferable that an inner diameter of the screw shaft insertion hole (introduction hole) 514 is large enough to allow the screw shaft 17 to be inserted without interference.

As shown in FIGS. 8 to 12, the gearbox 50 includes a worm housing section (second housing section) 515 which communicates with the first gear housing section 511 on the upper side (one side) in the vertical direction (intersecting direction intersecting with an axial direction of the first gear and an axial direction of the second gear) and in which the worm 80 is housed. In the present embodiment, the worm housing section 515 is formed into a cylindrical shape extending in the right-left direction (axial direction of the second gear), and insertion holes 516 are provided in a linked manner on both sides of the worm housing section 515 in the right-left direction.

Further, the gearbox mechanism 23 includes a pair of bearing bushes 70 and a metal washer (washer) 100. In the present embodiment, the metal washer (washer) 100 is inserted into the first shaft portion 62 on the front side, from the front side of the worm wheel (first gear) 60 in the front-rear direction, and a pair of bearing bushes 70 are respectively inserted into the first shaft portions 62 on both sides of the worm wheel 60. In a state where the metal washer 100 and the pair of bearing bushes 70 are inserted, the worm wheel 60 is housed in the worm wheel housing section 510. A nut 36 is screwed in and fixed to a front end 17d of the screw shaft 17 to fix the worm wheel 60 to the serration 17b of the screw shaft 17 in the front-rear direction.

In the present embodiment, the bearing bush 70 includes a cylindrical portion 71 and a flange portion 72 projecting radially outward from an end portion of the cylindrical portion 71. The bearing bush 70 is inserted into the worm wheel (first gear) 60 with the flange portion 72 positioned on the metal washer 100 side and the first gear portion 61 side. At this time, the cylindrical portion 71 is disposed between the first shaft portion 62 and the shaft hole portion, and the flange portion 72 is disposed between an end surface (side surface) 61a of the first gear portion 61 and the side surface 511b of the first gear housing section (first housing section) 511 on the front-rear direction (axial direction of the first gear) side.

Further, in the outer periphery of the flange portion 72, the even number of recesses 72a (in the present embodiment, two recesses) are formed so as to be recessed radially inward at equal intervals in a circumferential direction. An anti-rotation projection 511c which projects toward the flange portion 72 and is engageable with one of the recesses 72a formed in the flange portion 72 is formed at a position in contact with the side surface 511b in the inner peripheral surface 511a of the first gear housing section (first housing section) 511.

The worm wheel 60, the metal washer 100, and the pair of bearing bushes 70 are housed in the worm wheel housing section 72 in a state where the anti-rotation projection 511c is engaged with the recess 72a formed in the flange portion 72. Thus, the worm wheel 60 is rotatably housed in the worm wheel housing section 510, and the pair of bearing bushes 70 are housed in the worm wheel housing section 510 in a state where the rotation is restrained.

Further, in the present embodiment, the flange portion 72 is formed to have a larger diameter than an outer diameter of the first gear portion 61. When viewed along the front-rear direction (axial direction of the first gear), the anti-rotation projection 511c is formed at a position where the anti-rotation projection 511c overlaps only the flange portion 72 among the cylindrical portion 71 and the flange portion 72. In the present embodiment, the anti-rotation projection 511c is formed at a position where the anti-rotation projection 511c overlaps neither the cylindrical portion 71 nor the metal washer 100 when viewed along the front-rear direction (axial direction of the first gear).

In the present embodiment, an outer diameter of the ring-shaped metal washer (washer) 100 is formed to be smaller than an outer diameter of the first gear portion 61. When viewed along the front-rear direction (axial direction of the first gear), the anti-rotation projection 511c is positioned further on the outer side than the outer peripheral surface 100a of the metal washer (washer) 100.

The gearbox mechanism 23 is provided with a pair of bearing bushes 90, and the pair of bearing bushes 90 are respectively inserted into the second shaft portions 82 from both ends of the worm (second gear) 80 in the axial direction. The worm 80 with the pair of bearing bushes 90 inserted is housed in the worm housing section (second housing section) 515. The bearing bush 90 includes a cylindrical portion 91 and a flange portion 92 projecting radially outward from an end of the cylindrical portion 91. The respective bearing bushes 90 are inserted into the worm (second gear) 80 with the flange 92 portion positioned on the second gear 81 side.

Here, in the present embodiment, the gearbox 50 includes a first divided body 50R and a second divided body 50L which are divided in the right-left direction (axial direction of the second gear).

Figure 9:
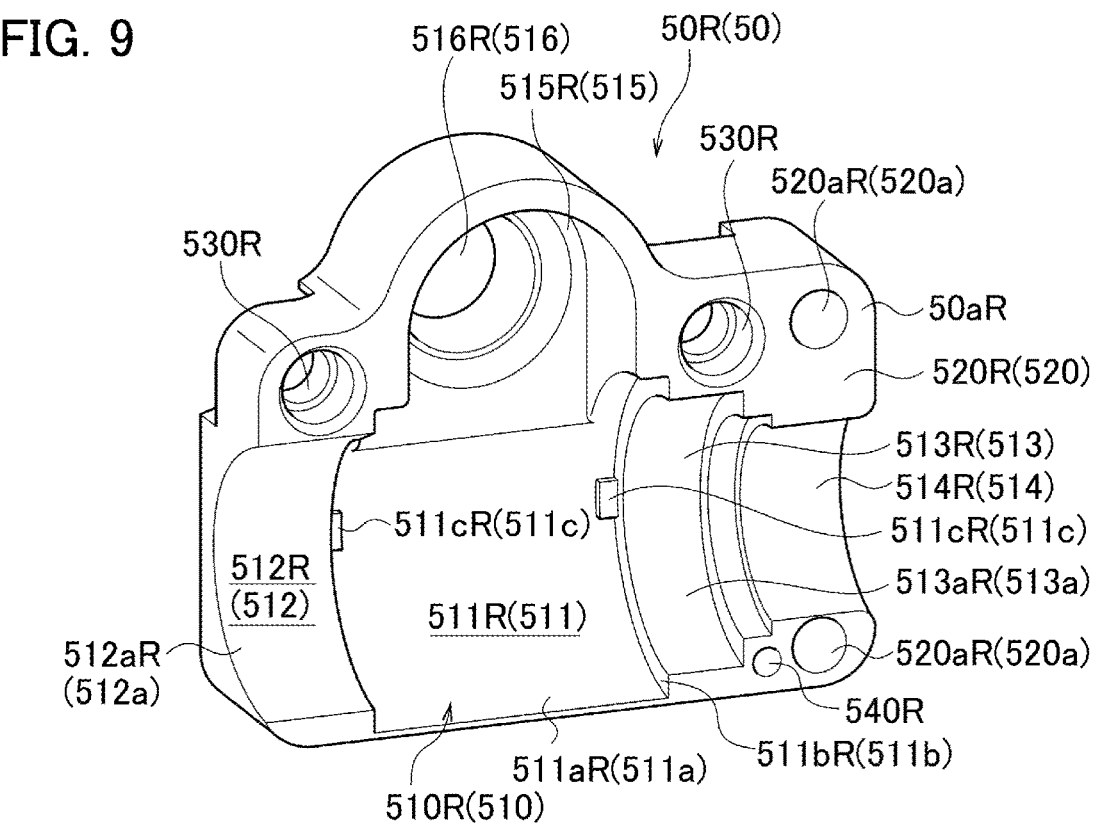
FIG. 9 is a perspective view showing a first divided body of the gearbox mechanism according to the embodiment, wherein the first divided body is viewed from the inside.
Figure 10:
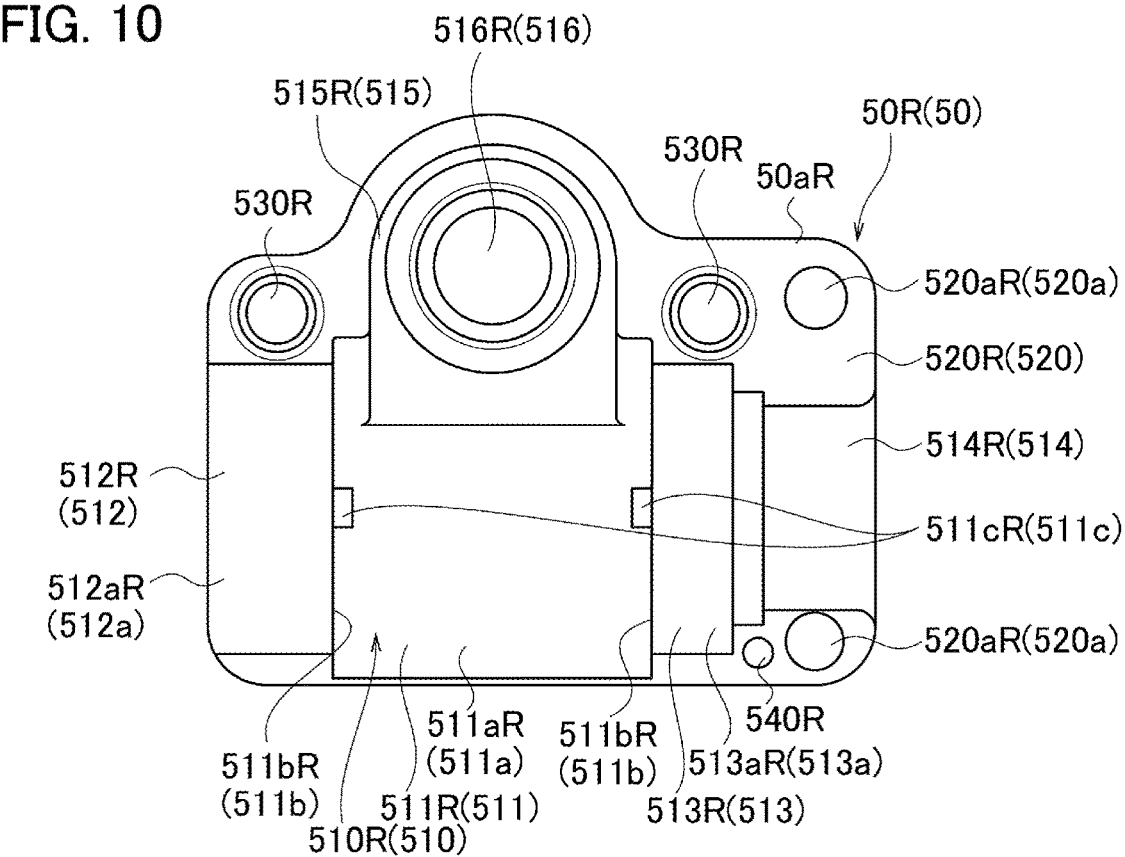
FIG. 10 is a perspective view showing the first divided body of the gearbox mechanism according to the embodiment, wherein the first divided body is viewed from the inside.

Specifically, as shown in FIGS. 9 and 10, the first divided body 50R includes a worm wheel housing section 510R in which a right half of the worm wheel 60 (first gear) is housed. The worm wheel housing section 510R includes a first semicircular gear housing section 511R in which a right half of the first gear portion 61 is housed and a semicircular front side shaft hole portion 512R and a semicircular rear side shaft hole portion 513R in which a right half of the first shaft portion 62 is housed.

A side surface 511bR is formed at a boundary portion with a shaft hole portion in the first gear housing section 511R, and the first gear housing section 511R is equal to a substantially semi-cylindrical space defined by an inner peripheral surface 511aR and the side surfaces 511bR formed at both ends of the inner peripheral surface 511aR in the front-rear direction.

Meanwhile, the front side shaft hole portion 512R is equal to a substantially semi-cylindrical space defined by an inner peripheral surface 512aR, and the rear side shaft hole portion 513R is equal to a substantially semi-cylindrical space defined by an inner peripheral surface 513aR.

Further, the worm wheel housing section 510R includes a screw shaft insertion hole 514R which communicates with the rear side shaft hole portion 513R, which is formed on the rear side (one side) in the front-rear direction (axial direction of the first gear), from the rear. The screw shaft insertion hole 514R is smaller in diameter than the rear side shaft hole portion 513R and opens to the rear (outside) of the first divided body 50R. The front side shaft hole portion 512R is formed to open to the front (outside) of the first divided body 50R. Thus, the worm wheel housing section 510R penetrating in the front-rear direction is formed in the first divided body 50R.

Further, as shown in FIGS. 9 and 10, the first divided body 50R includes a worm housing section 515R which communicates with the first gear housing section 511R on the upper side (one side) in the vertical direction (intersecting direction intersecting with an axial direction of the first gear and an axial direction of the second gear) and in which the right half of the worm 80 is housed. The worm housing section 515R is formed into a cylindrical shape extending in the right-left direction (axial direction of the second gear), and a bottomed bearing hole 516R in which the second shaft portion 82 is rotatably supported via the bearing bush 90 is provided in a linked manner on the right side of the worm housing section 515R.

An anti-rotation projection 511cR which projects toward the flange portion 72 and is engageable with one of the recesses 72a formed in the flange portion 72 is formed at a position in contact with the side surface 511bR in the inner peripheral surface 511aR of the first gear housing section 511R.

The anti-rotation projection 511cR is formed at a position where the anti-rotation projection 511cR overlaps only the flange portion 72 among the cylindrical portion 71 and the flange portion 72 when viewed along the front-rear direction (axial direction of the first gear). Further, the anti-rotation projection 511cR is formed at a position where the anti-rotation projection 511cR overlaps neither the cylindrical portion 71 nor the metal washer 100 when viewed along the front-rear direction (axial direction of the first gear). The anti-rotation projection 511cR is positioned further on the outer side than the outer peripheral surface 100a of the metal washer (washer) 100 when viewed along the right-left direction (axial direction of the second gear).

Figure 11:
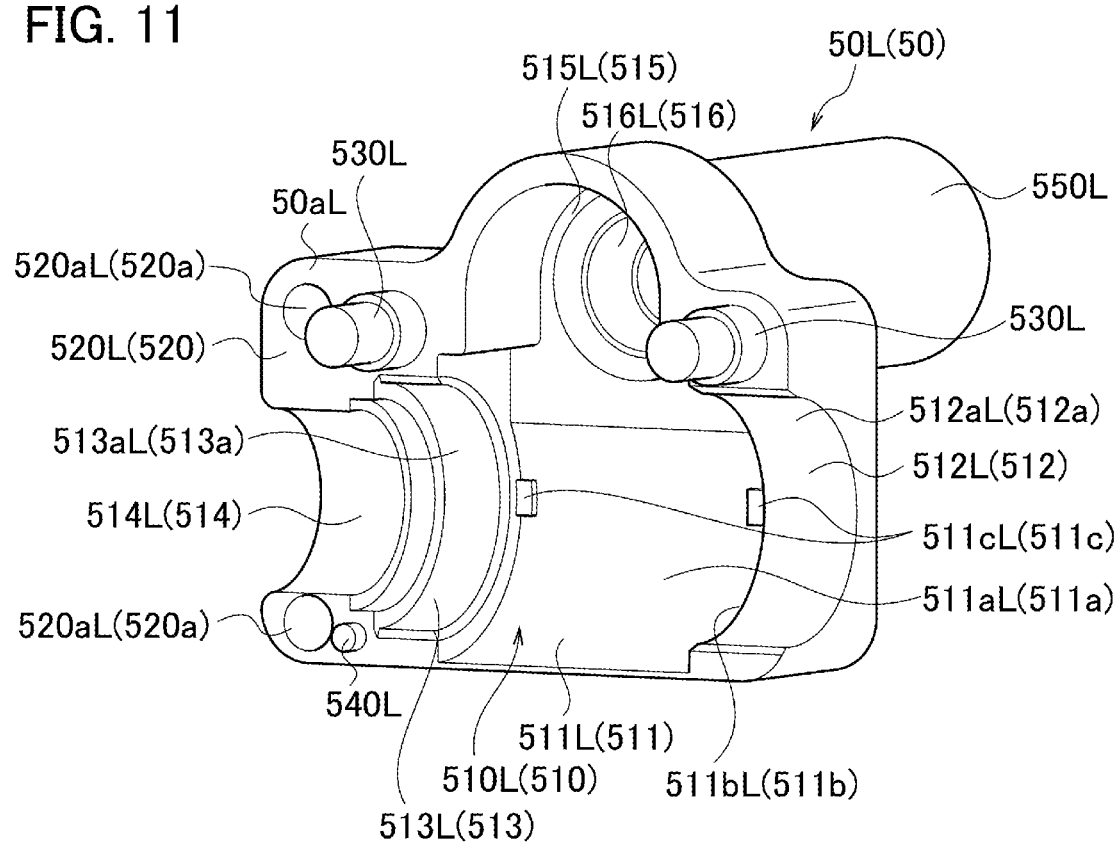
FIG. 11 is a perspective view showing a second divided body of the gearbox mechanism according to the embodiment, wherein the second divided body is viewed from the inside.
Figure 12:
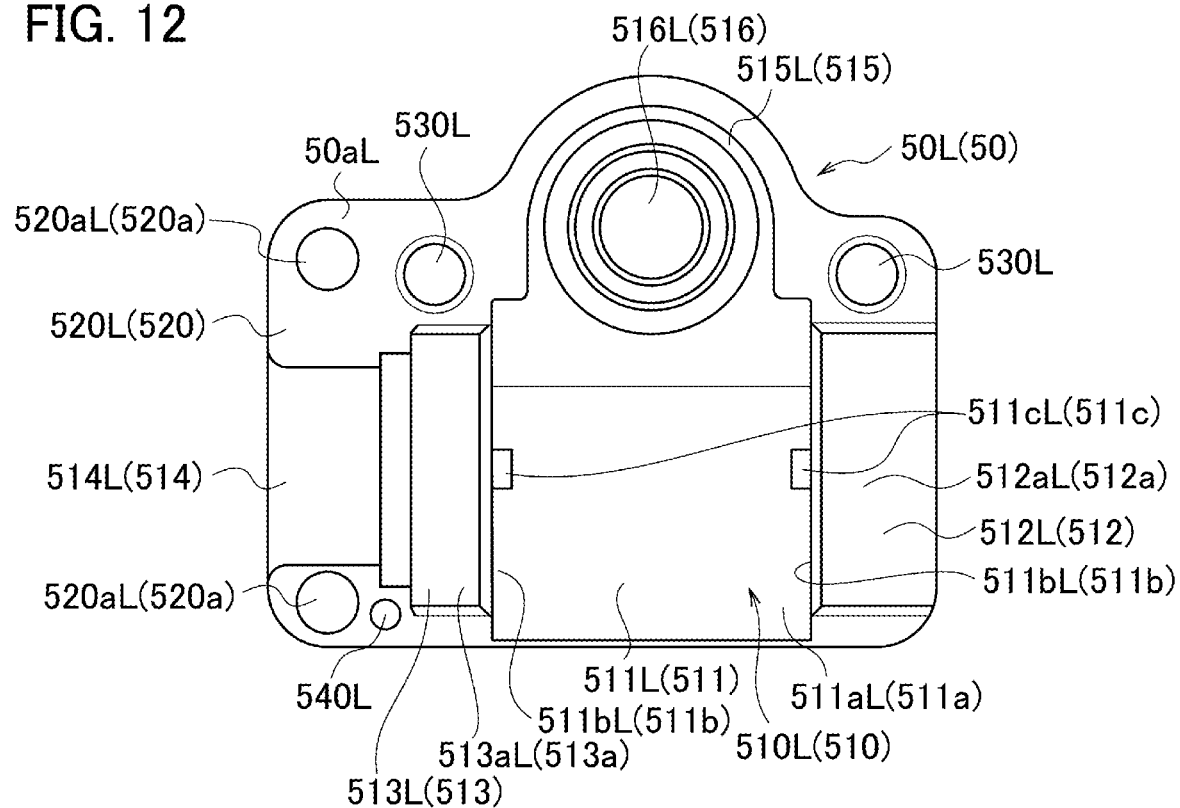
FIG. 12 is a perspective view showing the second divided body of the gearbox mechanism according to the embodiment, wherein the second divided body is viewed from the inside.

Meanwhile, as shown in FIGS. 11 and 12, the second divided body 50L includes a worm wheel housing section 510L in which a left half of the worm wheel (first gear) 60 is housed. The worm wheel housing section 510L includes a first semicircular gear housing section 511L in which a left half of the first gear portion 61 is housed, and a semicircular front side shaft hole portion 512L and a semicircular rear side shaft hole portion 513L in which a left half of the first shaft portion 62 is housed.

A side surface 511bL is formed at a boundary portion with a shaft hole portion in the first gear housing section 511L, and the first gear housing section 511L is equal to a substantially semi-cylindrical space defined by an inner peripheral surface 511aL and side surfaces 511bL formed at both ends of the inner peripheral surface 511aL in the front-rear direction.

Meanwhile, the front side shaft hole portion 512L is equal to a substantially semi-cylindrical space defined by an inner peripheral surface 512aL, and the rear side shaft hole portion 513L is equal to a substantially semi-cylindrical space defined by an inner peripheral surface 513aL.

Further, the worm wheel housing section 510L includes a screw shaft insertion hole 514L which communicates with the rear side shaft hole portion 513L, which is formed on the rear side (one side) in the front-rear direction (axial direction of the first gear), from the rear. The screw shaft insertion hole 514L is smaller in diameter than the rear side shaft hole portion 513L and opens to the rear (outside) of the second divided body 50L. The front side shaft hole portion 512L is formed to open to the front (outside) of the second divided body 50L. Thus, the worm wheel housing section 510L penetrating in the front-rear direction is formed in the second divided body 50L.

Further, as shown in FIGS. 11 and 12, the second divided body 50L includes a worm housing section 515L which communicates with the first gear housing section 511L on the upper side (one side) in the vertical direction (intersecting direction intersecting with an axial direction of the first gear and an axial direction of the second gear) and in which the left half of the worm 80 is housed. The worm housing section 515L is formed into a cylindrical shape extending in the right-left direction (axial direction of the second gear), and a bearing hole 516L is provided in a linked manner on the left side of the worm housing section 515L. In the bearing hole 516L, the second shaft portion 82 is rotatably supported via the bearing bush 90 and an output shaft of a motor or a driving member connected to the output shaft is inserted.

An anti-rotation projection 511cL which projects toward the flange portion 72 and is engageable with one of the recesses 72a formed in the flange portion 72 is formed at a position in contact with the side surface 511bL in the inner peripheral surface 511aL of the first gear housing section 511L.

The anti-rotation projection 511cL is also formed at a position where the anti-rotation projection 511cL overlaps only the flange portion 72 among the cylindrical portion 71 and the flange portion 72 when viewed along the front-rear direction (axial direction of the first gear). Further, the anti-rotation projection 511cL is formed at a position where the anti-rotation projection 511cL overlaps neither the cylindrical portion 71 nor the metal washer 100 when viewed along the front-rear direction (axial direction of the first gear). The anti-rotation projection 511cL is positioned further on the outer side than the outer peripheral surface 100a of the metal washer (washer) 100 when viewed along the right-left direction (axial direction of the second gear).

Further, the second divided body 50L includes a motor connection portion 550L to which an output shaft of a motor or a driving member connected to the output shaft is connected.

Further, in the present embodiment, two pairs of a shaft projection 530L and a through-hole 530R are formed in the divided surfaces 50aR and 50aL of the first divided body 50R and the second divided body 50L. The shaft projections 530L project toward the opposite divided body and are inserted into the through-holes 530R.

More specifically, the shaft projections 530L projecting toward the first divided body 50R are formed in the divided surface 50aL of the second divided body 50L, and the through-holes 530R into which the shaft projections 530L are inserted are formed in the divided surface 50aR of the first divided body 50R.

The two pairs of the shaft projection 530L and the through-hole 530R are formed at positions where they are superposed on the shaft hole portion in the vertical direction (intersecting direction) and superposed on the worm housing section 515 in the front-rear direction (axial direction of the first gear). In the present embodiment, the two pairs of the shaft projection 530L and the through-hole 530R are formed on both sides of the worm housing section 515 in the front-rear direction (axial direction of the first gear). That is, a pair of the shaft projection 530L and the through-hole 530R is formed on the upper side of the front side shaft hole 512 and on the front side of the worm housing section 515, and a pair of the shaft projection 530L and the through-hole 530R is formed on the upper side of the rear side shaft hole 513 and on the rear side of the worm housing section 515. Thus, in the present embodiment, the two pairs of the shaft projection 530L and the through-hole 530R are superposed on the shaft hole portion in the vertical direction (intersecting direction), and are formed at positions superposed on the worm housing section 515 in the front-rear direction (axial direction of the first gear). In this respect, the worm 80 is interposed between the shaft projections 530L and the through-holes 530R in the front-rear direction (axial direction of the worm wheel 60).

After the first divided body 50R and the second divided body 50L are superposed, the tips of the shaft projections 530L are crushed by staking or the like, whereby the first divided body 50R and the second divided body 50L are coupled.

In the present embodiment, a positioning projection 540L is formed on a lower side at the rear of the second divided body 50L, and a positioning recess 540R is formed on a lower side at the rear of the first divided body 50R. This makes it possible to reliably prevent a positional deviation between the first divided body 50R and the second divided body 50L even when the first divided body 50R and the second divided body 50L are coupled only on the upper side.

Further, in the present embodiment, attachment portions 520 attached to the upper rail 3 are formed at the rear end portion of the gearbox 50, and the attachment portions 520 of the gearbox 50 include a pair of fixing holes 520a penetrating in the right-left direction. That is, an attachment portion 520R attached to the right side of the upper rail 3 is formed at the rear end portion of the first divided body 50R, and an attachment portion 520L attached to the left side of the upper rail 3 is formed at the rear end portion of the second divided body 50L. A fixing hole 520aR penetrating in the right-left direction is formed in the attachment portion 520R of the first divided body 50R, and a fixing hole 520aL penetrating in the right-left direction is formed in the attachment portion 520L of the first divided body 50L.

In a state where the fixing holes 520a communicate with the mounting holes 3fh formed in the mounting plates 3f of the upper rail 3, pins (fasteners) 27 are inserted into the mounting holes 3fh and the fixing holes 520a and the inserted tips of the pins 27 are staked, and thus the gearbox 50 (gearbox mechanism 23) is fixed to the upper rail 3 (slide rail portion 2 as a fixing side member).

Further, the fixing holes 520a are formed at a position superposed on the screw shaft insertion hole 514 in the gearbox 50 in the vertical direction (intersecting direction). In the present embodiment, the fixing holes 520a are formed on both sides in the vertical direction (intersecting direction). That is, the pair of fixing holes 520a into which the pins (fasteners) 27 for fixing the gearbox 50 to the slide rail (fixing side member) 2 are inserted are formed at a position which is superposed on the screw shaft insertion hole 514 of the gearbox 50 in the vertical direction (intersecting direction). In this respect, the screw shaft insertion hole 514 is interposed between the pair of fixing holes 520a in the vertical direction (intersecting direction). Accordingly, in a state where the electric seat sliding device 10 is assembled, the fixing holes 520a are formed on both upper and lower sides of the screw shaft 17.

[Structure of Shaft Hole Portions of Worm Wheel in Gearbox]

Next, an example of the structure of the shaft hole portions (front side shaft hole portion 512 and rear side shaft hole portion 513) of the worm wheel (first gear) 60 in the gearbox 50 will be described in detail with reference to FIGS. 13 and 14.

In the present embodiment, the gearbox 50 includes the cylindrical front side shaft hole portion 512 and the cylindrical rear side shaft hole portion 513 (a pair of shaft hole portions) in which the first shaft portion 62 of the worm wheel 60 is housed.

Figure 13:
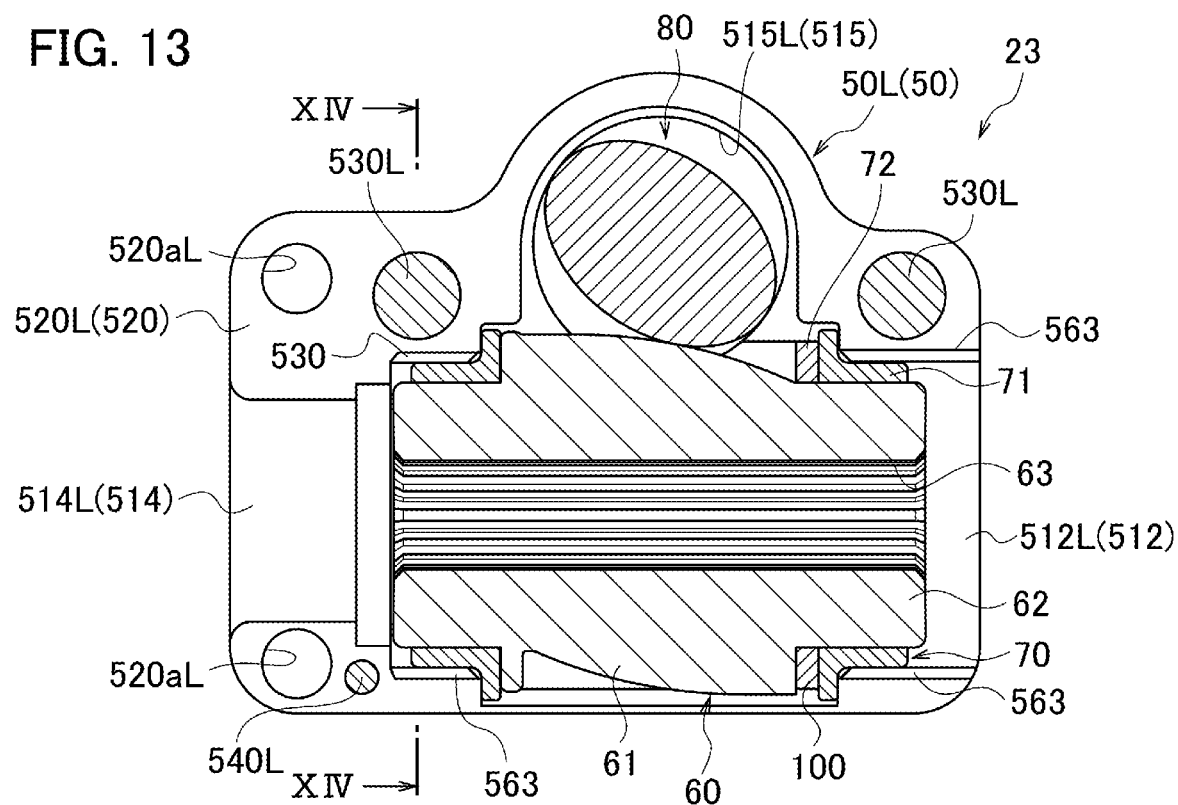
FIG. 13 is a side sectional view in a divided surface showing the gearbox mechanism according to the embodiment.
Figure 14:
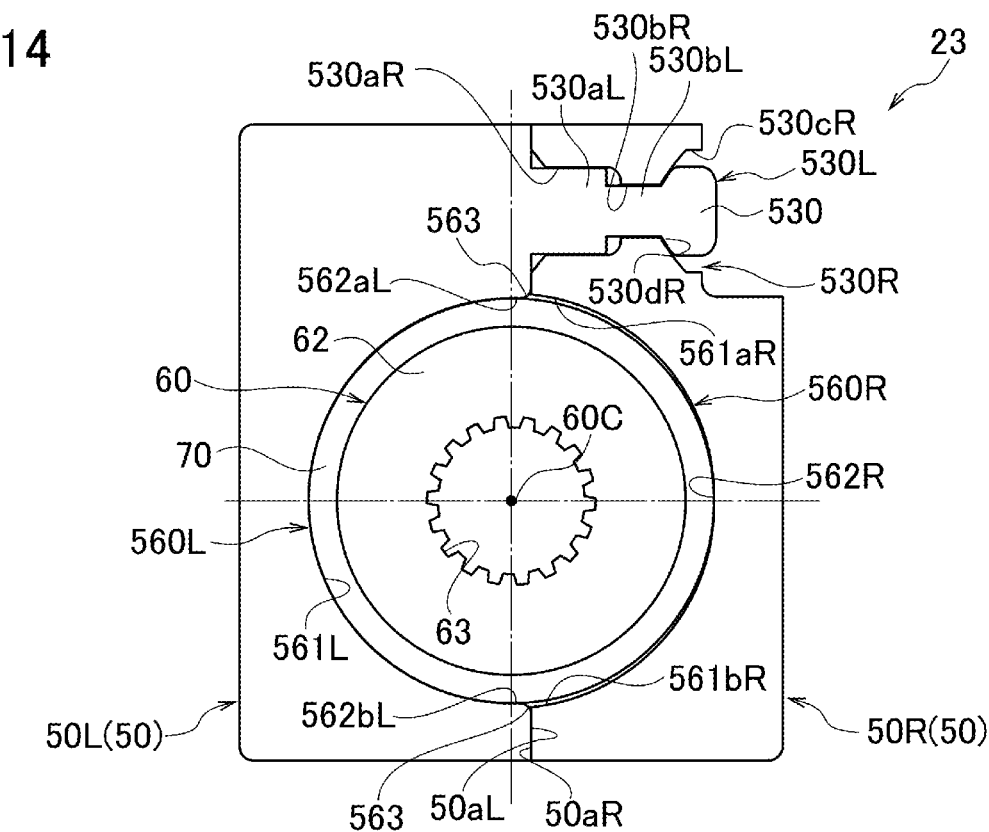
FIG. 14 is a diagram taken from line XIV-XIV of FIG. 13.

As shown in FIGS. 13 and 14, a semicircular arc-shaped first recess 560R and a semicircular arc-shaped second recess 560L are formed in the first divided body 50R and the second divided body 50L (a pair of divided bodies), and in the semicircular arc-shaped first recess 560R and the semicircular arc-shaped second recess 560L, the respective shaft hole portions are divided in the right-left direction (axial direction of the second gear).

In the present embodiment, the divided surfaces 50aR and 50aL of the first divided body 50R and the second divided body 50L are offset to the first divided body 50R side in an intersecting direction (right-left direction) with respect to an axis center 60C of the worm wheel 60.

The second recess 560L including the shaft hole portions on the second divided body 50L side includes a second semicircular arc portion (semicircular arc portion) 561L formed concentrically with the axis center 60C of the worm wheel 60. In addition, the second recess 560L includes a second linear portion (upper linear portion 562aL and lower linear portion 562bL) which is formed continuous to both ends of the second arc portion 561L and extends linearly toward the first divided body 50R side in the right-left direction.

The length of the upper linear portion 562aL and the lower linear portion 562bL extending in the right-left direction is preferably about 0.2 mm to 0.5 mm.

A relief arc portion 563 having a predetermined radius of curvature is formed at a corner portion between: the divided surface 50aL of the second divided body 50L; and the upper linear portion 562aL and the lower linear portion 562bL.

Meanwhile, the first recess 560R including the shaft hole portions on the first divided body 50R side includes a first linear portion 562R which is formed at a position superposed on the axis center 60C of the worm wheel 60 in the left-right direction and linearly extends in a direction (vertical direction) orthogonal to the left-right direction. Further, the first recess 560R includes a quarter-arc-shaped first portion (upper arc portion 561aR and lower arc portion 561bR) which is formed continuous to both ends of the first linear portion 562R and has the same radius of curvature as the second arc portion 561L. That is, the first arc portion (upper arc portion 561aR and lower arc portion 561bR) is formed with the same radius of curvature as the second arc portion 561L around a position that is offset in the vertical direction by the length of the first linear portion 562R from the position of the axis center 60C of the worm wheel 60.

The length of the first linear portion 562R extending in the vertical direction is preferably about 0.2 mm to 0.5 mm.

The through-hole 530R is formed in the divided surface 50aR of the first divided body 50R, and the shaft projection 530L is formed on the divided surface 50aL of the second divided body 50L.

In the present embodiment, the shaft projection 530L is formed into a stepped shape in which an outer diameter of a base portion 530aL side is larger than an outer diameter of a tip portion 530bL side.

Meanwhile, the through-hole 530R is formed with a first hole portion 530aR, a second hole portion 530bR, and a third hole portion 530cR in this order from the second divided body 50L side. The base portion 530aL of the shaft projection 530L is housed in the first hole portion 530aR, the tip portion 530bL of the shaft projection 530L is housed in the second hole portion 530bR, which is smaller in diameter than the first hole portion 530aR. The third hole portion 530cR has an inner diameter larger than an inner diameter of the first hole portion 530aR. The through-hole 530R includes a counter boring 530dR formed at an opening end on the opposite side of the second divided body 50L side (see FIG. 14).

Further, in a state where the shaft projection 530L is inserted into the through-hole 530R, a clearance between the base portion 530aL of the shaft projection 530L and the first hole portion 530aR is smaller than a clearance between the tip portion 530bL of the shaft projection 530L and the second hole portion 530bR. In this state, the tip portion 530bL of the shaft projection 530L is staked in the third hole portion 530cR (in the counter boring 530dR).

[Assembly Example of Gearbox Mechanism]

Next, an example of how to assemble the gearbox mechanism 23 will be described below.

First, the metal washer (washer) 100 is inserted from the front side of the worm wheel (first gear) 60 in the front-rear direction. Thereafter, the respective bearing bushes 70 are inserted.

The left half of the worm wheel 60 with the metal washer 100 and the pair of bearing bushes 70 inserted is housed in the worm wheel housing section 510L of the second divided body 50L. At this time, the left half of the worm wheel 60 is housed in the worm wheel housing section 510L in a state where the respective recesses 72a formed in the flange portions 72 of the bearing bushes 70 on both sides in the front-rear direction are engaged with the anti-rotation projections 511cL formed in the worm wheel housing section 510L on both sides in the front-rear direction.

Next, the left half of the worm 80 with the pair of bearing bushes 90 inserted is housed in the worm housing section 515L of the second divided body 50L. At this time, the left half of the worm 80 is housed in the worm housing section 515L in a state where the second gear portion 81 meshes with the first gear portion 61.

Thereafter, the shaft projection 530L formed in the divided surface 50aL of the second divided body 50L is inserted into the through-hole 530R formed in the divided surface 50aR of the first divided body 50R, and the positioning projection 540L formed on a lower side at the rear of the second divided body 50L is inserted into the positioning recess 540R formed on a lower side at the rear of the first divided body 50R, and thus the second divided body 50L and the first divided body 50R are superposed on each other. At this time, the anti-rotation projection 511cR, which is formed in the worm wheel housing section 510R, on both sides in the front-rear direction is engaged with one of the recesses 72a formed in the flange portions 72 of the bearing bushes 70 on both sides in the front-rear direction.

Next, the tip of the shaft projection 530L is staked to form a staked portion 530 (see FIG. 14).

As a result, the gearbox mechanism 23 is assembled.

Either of the worm wheel 60 and the worm 80 may be housed first, or these may be housed simultaneously.

Further, the worm wheel 60 and the worm 80 may be housed in the first divided body 50R first.

[Example of Assembling Gearbox Mechanism to Slide Rail Portion]

Next, an example of how to assemble the assembled gearbox mechanism 23 to the slide rail portion 2 will be described below. More specifically, the slide rail portion 2 such as the upper rail 3, the lower rail 1, the nut member 19, and the screw shaft 17 shown in FIG. 1 has already been assembled, and an example of how to assemble the gearbox mechanism 23 to the slide rail portion 2 will be described below.

First, the screw shaft 17 is inserted into the serration hole 63 formed in an axial center (center portion) of the worm wheel 60. At this time, the serration 17b of the screw shaft 17 is meshed with the serration hole 63.

Next, in a state where the fixing holes 520a communicate with the mounting holes 3fh formed in the mounting plates 3f of the upper rail 3, the pins (fasteners) 27 are inserted into the mounting holes 3fh and the fixing holes 520a, and tips of the pin 27 are staked and fixed.

Next, the nut 36 is screwed into the male screw portion 17a of the screw shaft 17, and the screw shaft 17 and the worm wheel 60 are integrally fixed in the front-rear direction.

Thus, the gearbox 50 (gearbox mechanism 23) is fixed to the upper rail 3 (slide rail portion 2 as a fixing side member). The gearbox 50 (gearbox mechanism 23) may be fixed to the upper rail 3 by the pins 27 after the nut 36 is screwed onto the male screw portion 17a of the screw shaft 17.

As described above, in the present embodiment, the following structure is employed: in a state where the screw shaft 17 is assembled to the upper rail 3 (rail side) in advance, the gearbox mechanism 23 is assembled to a tip of the screw shaft 17 in such a way as to be inserted.

[Operation and Effect]

Hereinafter, a description will be given of characteristic structures of the gearbox mechanism 23 and the electric seat sliding device 10 shown in the above embodiment and the effects obtained therefrom.

(1) A gearbox mechanism 23 of the present embodiment includes: a first gear (worm wheel 60); a second gear (worm 80) disposed to intersect with the worm wheel 60 and meshing with the worm wheel 60; and a gearbox 50 in which the worm wheel 60 and the worm 80 are rotatably housed. The worm wheel 60 includes: a first gear portion 61 disposed at a center portion of the worm wheel 60 in an axial direction and meshing with the worm 80, and a pair of first shaft portions 62 smaller in outer diameter than the first gear portion 61 and disposed on both sides of the first gear portion 61 in an axial direction. The gearbox 50 includes a first housing section (first gear housing section 511) in which the first gear portion 61 is housed, a pair of shaft hole portions (a front side shaft hole portion 512 and a rear side shaft hole portion 513) smaller in diameter than the first gear housing section 511 and in which the first shaft portion 62 is housed, and a second housing section (worm housing section 515) configured to communicate with the first gear housing section 511 on one side in an intersecting direction intersecting with the axial direction of the worm wheel 60 and the axial direction of the worm 80 and in which the worm 80 is housed. A bearing bush 70 is disposed between: the first shaft portion 62; and the front side shaft hole portion 512 and the rear side shaft hole portion 513, and the gearbox 50 includes a first divided body 50R and a second divided body 50L which are divided in the axial direction (right-left direction) of the worm 80. A shaft projection 530L projecting toward an opposite divided body and a through-hole 530R into which the shaft projection 530L is inserted are formed in divided surfaces 50aR and 50aL of the first divided body 50R and the second divided body 50L, and the divided surfaces 50aR and 50aL of the first divided body 50R and the second divided body 50L are formed at offset positions that are offset to the first divided body 50R side in an intersecting direction with respect to an axis center 60C of the worm wheel 60. A second recess 560L on the second divided body 50L side including the front side shaft hole portion 512 and the rear side shaft hole portion 513 includes a second semicircular arc portion 561L formed concentrically with the axis center 60C of the worm wheel 60, and a second linear portion (upper linear portion 562aL and lower linear portion 562bL) which is formed continuous to both ends of the second arc portion 561L and extends linearly toward the first divided body 50R side in the intersecting direction. A first recess 560R on the first divided body 50R side including the front side shaft hole portion 512 and the rear side shaft hole portion 513 includes a first linear portion 562R which is formed at a position superposed on the axis center 60C of the worm wheel 60 in the intersecting direction and extends linearly in a vertical direction orthogonal to the intersecting direction, and a quarter-arc-shaped first portion (upper arc portion 561aR and lower arc portion 561bR) which is formed continuous to both ends of the first linear portion 562R and has the same radius of curvature as the second arc portion 561L.

The first recess 560R of the first divided body 50R including the front side shaft hole portion 512 and the rear side shaft hole portion 513 is formed so as to be wide in the vertical direction by an amount corresponding to the size of the first linear portion 562R extending in the vertical direction, and has a relief shape in the vertical direction. Accordingly, even when the first divided body 50R and the second divided body 50L have shifted and are fixed in the vertical direction, the bearing bush 70 rotatably supporting the first shaft portion 62 of the worm wheel 60 is not partially pushed, and thus the rotation of the worm wheel 60 is stabilized.

In the second recess 560L of the second divided body 50L including the front side shaft hole portion 512 and the rear side shaft hole portion 513, the upper linear portion 562aL and the lower linear portion 562bL extending in the right-left direction are provided so as to extend to the first divided body 50R side further than an axis center 60C of the worm wheel 60. Accordingly, even when the dimensions of the respective components vary, the axial center 60C of the worm wheel 60 direction does not deviate in the right-left direction, from the upper linear portion 562aL and the lower linear portion 562bL extending in the right-left direction, and thus it is possible to prevent the axial center 60C from entering the first divided body 50R side.

This makes it possible to stabilize the rotation of the worm wheel 60, and the above relief shape formed by the first linear portion 562R can reduce the occurrence of vibration, abnormal noise, etc., when the worm wheel 60 rotates. In addition, the above relief shape formed by the first linear portion 562R can also improve the assemblability of the gearbox mechanism 23.

(2) The length of the first linear portion 562R, the upper linear portion 562aL, and the lower linear portion 562bL in a linearly extending direction is 0.2 mm to 0.5 mm.

The upper linear portion 562aL and the lower linear portion 562bL extending in the right-left direction only have to have a length such that the axial center 60C of the worm wheel 60 does not deviate from the upper linear portion 562aL and the lower linear portion 562bL due to variations in the dimensions of the respective components. Accordingly, it is sufficient that the length of the upper linear portion 562aL and the lower linear portion 562bL in a linearly extending direction be 0.2 mm to 0.5 mm.

Further, in the first linear portion 562R extending in the vertical direction, it is necessary that a corner portion between either the upper arc portion 561aR or the lower arc portion 561bR of the first divided body 50R and the divided surface 50aL does not further enter the shaft center 60C side of the worm wheel 60 than a corner portion between the second arc portion 561L of the second divided body 50L and the divided surface 50aL due to deformation generated by staking or variations in the dimensions of the respective components. Accordingly, it is also sufficient that the length of the first linear portion 562R in a linearly extending direction be 0.2 mm to 0.5 mm.

This makes it possible to reduce the occurrence of vibration, abnormal noise, etc., when the worm wheel 60 rotates without largely changing the shapes of the shaft hole portions (front side shaft hole portion 512 and rear side shaft hole portion 513) of the worm wheel 60 in the gearbox 50 from the conventional shapes.

(3) A relief arc portion 563 having a predetermined radius of curvature is formed at a corner portion between: the divided surface 50aL of the second divided body 50L; and the upper linear portion 562aL and the lower linear portion 562bL.

The upper linear portion 562aL and the lower linear portion 562bL extending in the right-left direction only have to have a length such that the axial center 60C of the worm wheel 60 does not deviate from the upper linear portion 562aL and the lower linear portion 562bL due to variations in the dimensions of the respective components. Accordingly, it is conceivable for the upper linear portion 562aL and the lower linear portion 562bL to be extended as they are and connected to the divided surface 50aL of the second divided body 50L. However, since the respective bearing bushes 70 have a circular shape, the bearing bush 70 is separated from the upper linear portion 562aL and the lower linear portion 562bL by an amount corresponding to the length that the bearing bush 70 is separated from the axis center 60C of the worm wheel 60 in the right-left direction, and thus the bearing bush 70 is not brought into contact with the upper linear portion 562aL and the lower linear portion 562bL even if these are extended. Accordingly, the divided surface 50aL of the second divided body 50L, the upper linear portion 562aL, and the lower linear portion 562bL are connected in the relief arc portion 563.

Since a connection between the upper linear portion 562aL and the lower linear portion 562bL extending in the right-left direction and the divided surface 50aL of the second divided body 50L is made in the relief arc portion 563, it is possible to eliminate a waste of materials in molding. In addition, the insertability when the first shaft portion 62 of the worm wheel 60 and the bearing bushing 70 are assembled to the second recess 560L, which is deepened by an amount corresponding to the size of the upper linear portion 562aL and the lower linear portion 562bL, can be improved.

(4) The through-hole 53OR is formed in the divided surface 50aR of the first divided body 50R and the shaft projection 530L is formed on the divided surface 50aL of the second divided body 50L, and the shaft projection 530L is formed in a stepped shape in which an outer diameter of a base portion 530aL side is larger than an outer diameter of a tip portion 530bL side. The through-hole 530R is formed with a first hole portion 530aR, a second hole portion 530bR, and a third hole portion 530cR in this order from the second divided body 50L side. The base portion 530aL of the shaft projection L is housed in the first hole portion 530aR, the tip portion 530bL of the shaft projection 530L is housed in the second hole portion 530bR smaller in diameter than the first hole portion 530aR, and the third hole portion 530cR has an inner diameter larger than an inner diameter of the first hole portion 530aR In a state where the shaft projection 530L is inserted into the through-hole 530R, a clearance between the base portion 530aL of the shaft projection 530L and the first hole portion 530aR is smaller than a clearance between the tip portion 530bL of the shaft projection 530L and the second hole portion 530bR. In this state, the tip portion 530bL of the shaft projection 530L is staked in the third hole portion 530cR.

Since the tip portion 530bL of the shaft projection 530L is made thin and the base portion 530aL of the shaft projection 530L is made thick, it is possible to reduce a positional deviation, which is caused by collapse of the shaft projection 530L at the time of staking, in the superposed surfaces of the divided bodies (divided surfaces of the gearbox 50).

Since a positional adjustment between the base portion 530aL of the shaft projection 530L and the first hole portion 530aR is made, it is possible to further reduce a positional deviation, which is caused by collapse of the shaft projection 530L at the time of staking, in the superposed surfaces of the divided bodies (divided surfaces of the gearbox 50).

(5) An electric seat sliding device 10 of the present embodiment includes: a gearbox mechanism 23; and a slide rail portion 2 as a fixing side member to which the gearbox mechanism 23 is fixed. The slide rail portion 2 includes: a lower rail 1 fixed to a vehicle; an upper rail 3 moving relative to the lower rail 1 along a longitudinal direction of the lower rail 1: a screw shaft 17 rotatably attached to one of the lower rail 1 and the upper rail 3, extending along a direction of the relative movement, and integrally coupled to the worm wheel 60 to rotate together with the worm wheel 60; and a nut member 19 attached to the other of the lower rail 1 and the upper rail 3 and screwed onto the screw shaft 17.

Thus, the electric seat sliding device 10 makes it possible to reduce the occurrence of vibration, abnormal noise, etc., when the gearbox mechanism 23 is driven by devising the shape of shaft hole portions (front side shaft hole portion 512 and rear side shaft hole portion 513) of the worm wheel 60 in the gearbox 50 such that a positional deviation of the divided surfaces 50aR and 50aL of the gearbox 50 is absorbed.

As described above, the present embodiment makes it possible to obtain the gearbox mechanism 23 and the electric seat sliding device 10 provided with the gearbox mechanism 23, which is capable of reducing the occurrence of vibration, abnormal noise, etc., when the worm wheel 60 in the gearbox 50 rotates, by devising the shape of the front side shaft hole portion 512 and the rear side shaft hole portion 513 of the worm wheel 60 in the gearbox 50 such that a positional deviation of the divided surfaces of the gearbox 50 (divided surfaces of the divided bodies) is absorbed.

[Other]

Although the embodiment of the present disclosure has been described above, the embodiment is merely illustrative to facilitate understanding of the present invention, and the present invention is not intended to be limited to the embodiment. The technical scope of the present disclosure is not limited to the specific technical matters disclosed in the above embodiments, but also includes various modifications, alternations, alternative technologies, etc., which may be easily derived therefrom.

For example, although the screw shaft 17 is attached to the upper rail 3 and the nut member 19 is attached to the lower rail 1 in the above embodiment, the screw shaft 17 may be attached to the lower rail 1 and the nut member 19 may be attached to the upper rail 3.

Further, in the above embodiment, the through-hole 530R is formed in the divided surface 50aR of the first divided body 50R and the shaft projection 530L is formed on the divided surface 50aL of the second divided body 50L as an example; however, a shaft projection may be formed on the divided surface 50aR of the first divided body 50R and a through-hole may be formed in the divided surface 50aL of the second divided body 50L. In addition, a shaft projection may be formed on one side in the front-rear direction of the divided surface 50aR of the first divided body 50R, and a through-hole may be formed on the other side thereof, and a through-hole may be formed on one side in the front-rear direction of the divided surface 50aL of the second divided body 50L and a shaft projection may be formed on the other side thereof.

Further, the gearbox mechanism 23 according to the present disclosure may be assembled to a device other than the seat sliding device.

Although the pins 27 are employed as fasteners in the above embodiment, the present invention is not limited to the pins 27. For example, a fixing means such as a bolt and a nut for fixing the gearbox 50 and the mounting plates 3f in such a way as to sandwich them in the right-left direction (axial direction of the fastener) may be employed.

Further, the gearbox, the slide rail portion, and other detailed specifications (shape, size, layout, etc.) may be changed as appropriate.

What is claimed is:

1. A gearbox mechanism comprising:
a first gear;
a second gear disposed to intersect with the first gear and meshing with the first gear; and
a gearbox in which the first gear and the second gear are rotatably housed, wherein
the first gear includes a first gear portion disposed at a center portion of the first gear in an axial direction and meshing with the second gear, and a pair of first shaft portions smaller in outer diameter than the first gear portion and disposed on both sides of the first gear portion in an axial direction,
the gearbox includes a first housing section in which the first gear portion is housed, a pair of shaft hole portions smaller in diameter than the first housing section and in which the first shaft portion is housed, and a second housing section configured to communicate with the first housing section on one side in an intersecting direction intersecting with the axial direction of the first gear and the axial direction of the second gear and in which the second gear is housed, a bearing bush is disposed between the first shaft portion and the shaft hole portion, the gearbox includes a first divided body and a second divided body which are divided in the axial direction of the second gear, a shaft projection projecting toward an opposite divided body and a through-hole into which the shaft projection is inserted are formed in divided surfaces of the first divided body and the second divided body, the divided surfaces of the first divided body and the second divided body are formed at offset positions that are offset to the first divided body side in an intersecting direction with respect to an axis center of the first gear, a second recess on the second divided body side including the shaft hole portions includes a second semicircular arc portion formed concentrically with the axis center of the first gear, and a second linear portion which is formed continuous to both ends of the second arc portion and extends linearly toward the first divided body side in the intersecting direction, and a first recess on the first divided body side including the shaft hole portions includes a first linear portion which is formed at a position superposed on the axis center of the first gear in the intersecting direction and extends linearly in a direction orthogonal to the intersecting direction, and a quarter-arc-shaped first portion which is formed continuous to both ends of the first linear portion and has the same radius of curvature as the second arc portion.

2. The gearbox mechanism according to claim 1, wherein a length of the first linear portion and the second linear portion in a linearly extending direction is 0.2 mm to 0.5 mm.

3. The gearbox mechanism according to claim 1, wherein a relief arc portion having a predetermined radius of curvature is formed at a corner portion between the divided surface of the second divided body and the second linear portion.

4. The gearbox mechanism according to claim 1, wherein the through-hole is formed in the divided surface of the first divided body, the shaft projection is formed on the divided surface of the second divided body, the shaft projection is formed in a stepped shape in which an outer diameter of a base portion side is larger than an outer diameter of a tip portion side, the through-hole is formed with a first hole portion, a second hole portion, and a third hole portion in this order from the second divided body side, and the base portion of the shaft projection is housed in the first hole portion, the tip portion of the shaft projection is housed in the second hole portion smaller in diameter than the first hole portion, and the third hole portion has an inner diameter larger than an inner diameter of the first hole portion, in a state where the shaft projection is inserted into the through-hole, a clearance between the base portion of the shaft projection and the first hole portion is smaller than a clearance between the tip portion of the shaft projection and the second hole portion, and the tip portion of the shaft projection is staked in the third hole portion.

5. A seat sliding device comprising:

the gearbox mechanism of claim 1; and a slide rail portion as a fixing side member to which the gearbox mechanism is fixed, wherein the slide rail portion includes:

a lower rail fixed to a vehicle;

an upper rail moving relative to the lower rail along a longitudinal direction of the lower rail;

a screw shaft rotatably attached to one of the lower rail and the upper rail, extending along a direction of the relative movement, and integrally coupled to the first gear to rotate together with the first gear; and a nut member attached to the other of the lower rail and the upper rail and screwed onto the screw shaft.

* * * * *